(12) United States Patent
Wren

(10) Patent No.: US 6,851,522 B2
(45) Date of Patent: Feb. 8, 2005

(54) WHEELCHAIR BRAKE ATTACHMENT APPARATUS

(76) Inventor: Larry V. Wren, 1539 N. China Lake Blvd., Ridgecrest, CA (US) 93555

( * ) Notice: Subject to any disclaimer, the term of this patent is extended or adjusted under 35 U.S.C. 154(b) by 0 days.

(21) Appl. No.: 10/350,589

(22) Filed: Jan. 24, 2003

(65) Prior Publication Data

US 2003/0146056 A1 Aug. 7, 2003

Related U.S. Application Data

(60) Provisional application No. 60/353,612, filed on Feb. 1, 2002.

(51) Int. Cl.$^7$ ................................................ B60T 1/00
(52) U.S. Cl. ...................... 188/2 F; 188/29; 188/57; 188/69; 188/31
(58) Field of Search ........................ 188/2 F, 29, 31, 188/60, 69; 280/250.1, 304.1, 242.1, 647, 650, 657; 297/DIG. 4

(56) References Cited

U.S. PATENT DOCUMENTS

| | | | |
|---|---|---|---|
| 4,082,348 A | * | 4/1978 | Haury .......................... 297/45 |
| 4,350,227 A | | 9/1982 | Knoche |
| 4,570,756 A | * | 2/1986 | Minnebraker et al. ...... 188/2 F |
| 4,679,816 A | * | 7/1987 | Riikonen ..................... 280/650 |
| 4,809,818 A | | 3/1989 | Leggett et al. |
| 4,989,890 A | * | 2/1991 | Lockard et al. ............... 280/42 |
| 5,188,383 A | * | 2/1993 | Thompson ............... 280/250.1 |
| 5,203,433 A | | 4/1993 | Dugas |
| 5,355,977 A | * | 10/1994 | Kuschall ..................... 188/2 F |
| 5,472,066 A | * | 12/1995 | Schillo et al. .............. 188/2 F |
| 5,743,545 A | * | 4/1998 | Kunze et al. ............ 280/250.1 |
| 5,894,912 A | | 4/1999 | Dobben |
| 6,352,307 B1 | * | 3/2002 | Engman ................. 297/284.11 |
| 6,443,268 B1 | * | 9/2002 | Dearth et al. ............... 188/2 F |
| 6,520,526 B2 | * | 2/2003 | Amirola ..................... 188/2 F |

* cited by examiner

Primary Examiner—Matthew C. Graham
Assistant Examiner—Mariano Sy

(57) ABSTRACT

A brake attachment apparatus is provided for a wheelchair and includes a wheelchair connector assembly for connecting to the wheelchair, a brake operator arm which extends horizontally along a portion of the wheelchair, a brake operator arm hinge connected to the wheelchair connector assembly for connecting the brake operator arm to the wheelchair connector assembly, and a wheel brake member connected to the brake operator arm. When a patient rises from a sitting position in the wheelchair or is in a standing position and sits down in the wheelchair, the patient exerts downward pressure on the brake operator arm, and that downward pressure is transmitted to the wheel brake member for applying braking pressure on the wheels of the wheelchair to prevent the wheelchair from moving.

13 Claims, 3 Drawing Sheets

FIG 5
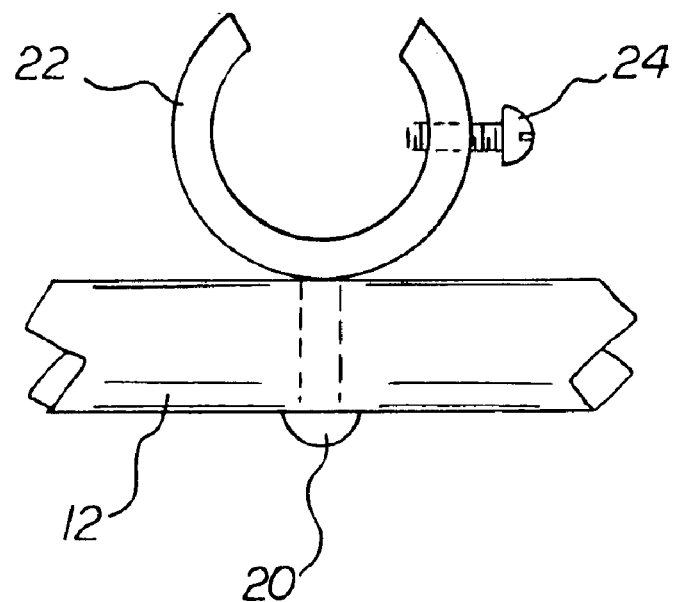
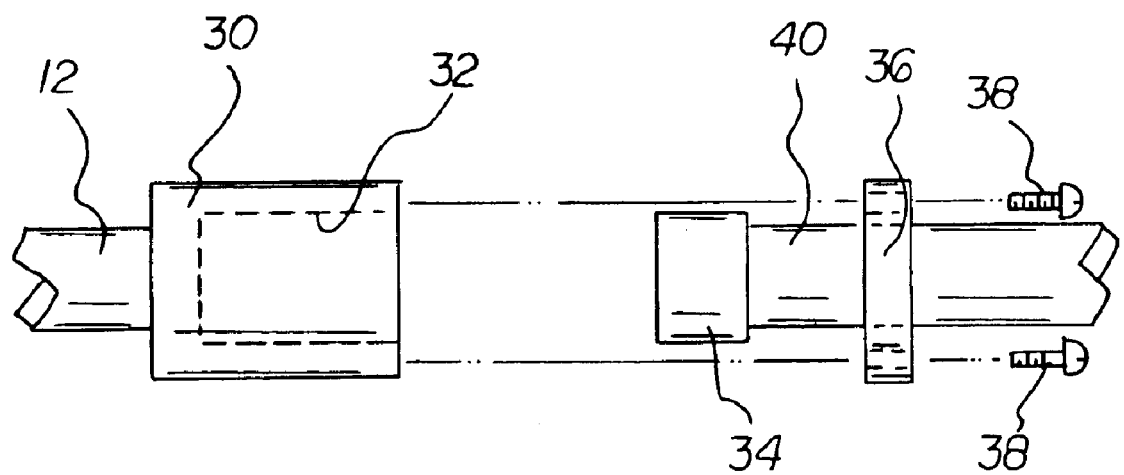
FIG 6

WHEELCHAIR BRAKE ATTACHMENT APPARATUS

CROSS-REFERENCE TO RELATED APPLICATION

This application claims priority based upon my copending Provisional Application Ser. No. 60/353,612, filed Feb. 1, 2002.

BACKGROUND OF THE INVENTION

1. Field of the Invention

The present invention relates generally to wheelchairs and, more particularly, to wheelchairs that have brake systems to prevent the wheelchair from moving when not desired.

2. Description of the Prior Art

It is well known in the art of wheelchairs that it is desirable to be able to brake a wheelchair to prevent the wheelchair from rolling. In this respect, throughout the years, a number of innovations have been developed relating to brakes for wheelchairs, and the following U.S. patents are representative of some of those innovations: U.S. Pat. Nos. 4,350,227, 4,570,756, 4,809,818, 5,203,433, and 5,894,912. More specifically, U.S. Pat. No. 4,350,227 discloses a wheelchair brake assembly which includes a three-link arrangement with hinged connections between the three links. A downward movement of an arm rest actuates the three-link arrangement to apply braking pressure to a wheelchair wheel. Use of downward pressure on an arm rest is desirable for applying a wheelchair brake. It would be desirable to avoid the complexities of the three-link arrangement for applying braking pressure on a wheelchair wheel.

U.S. Pat. No. 4,570,756 discloses a brake device for wheelchairs which includes a substantially vertically oriented hand brake lever that is moved essentially forward and backward to apply braking pressure on a wheelchair wheel. As stated above, it is desirable to use downward pressure on an arm rest for applying a wheelchair brake. Stated more generally, it is desirable to use downwardly vertical pressure on a horizontally oriented brake handle to apply braking pressure to a wheelchair wheel. The device in U.S. Pat. No. 4,570,756 does not provide this desirable feature.

U.S. Pat. No. 4,809,818 discloses a wheelchair lock device which attaches to both wheelchair hand brakes to activate both brakes when only one brake is manually actuated. This device appears to connect to two wheelchair hand brakes, both of which have substantially vertically oriented hand brake levers that are moved essentially forward and backward to apply and releasing braking pressure on a wheelchair wheel. As stated above, in contrast, it is desirable to use downwardly vertical pressure on a horizontally oriented brake handle to apply braking pressure to a wheelchair wheel.

U.S. Pat. No. 5,203,433 discloses an automatic braking wheelchair which is actuated when a user's weight rises from the wheelchair seat. For an existing wheelchair that does not include an automatic, seat-operated brake, it is a relatively complex and difficult task to retrofit such a wheelchair with an automatic, seat-operated brake. Conventional wheelchairs do not have automatic, seat-operated brakes. Yet, it would be desirable to be able to relatively easily retrofit a conventional wheelchair with an automatic brake. In this respect, it would be desirable to retrofit a conventional wheelchair with an automatic brake that is not seat operated. That is, it would be desirable to retrofit a conventional wheelchair with an automatic brake that is applied to the wheels of the wheelchair when a user is in the process of rising from the wheelchair without using a seat-operated brake.

U.S. Pat. No. 5,894,912 discloses a wheelchair braking device that is operated by a second person, one who pushes the wheelchair from behind, not the person seated in the wheelchair. For greater usefulness, it would be desirable to provide an automatic brake for a wheelchair that is operated by the person seated in the wheelchair.

Still other features would be desirable in a wheelchair brake attachment apparatus. For example, when a person seated in a wheelchair rises from the wheelchair under one's own power, the hands of the person bear down upon a horizontally oriented arm rest. As the person rises, if the wheelchair is not sufficiently braked, the wheelchair may roll out from under the person. Such a dangerous condition may occur if the person has forgotten or is unable to apply wheelchair brakes. In this respect, it would be desirable if an automatic brake for a wheelchair were provided that automatically applies wheelchair brakes when the hands of a person rising from a wheelchair bear down upon a horizontally arm-rest-like structure.

Thus, while the foregoing body of prior art indicates it to be well known to use brakes for wheelchairs, the prior art described above does not teach or suggest a wheelchair brake attachment apparatus which has the following combination of desirable features: (1) avoids the complexities of a three-link arrangement for applying braking pressure on a wheelchair wheel;. (2) employs downwardly vertical pressure on a horizontally oriented brake handle to apply braking pressure to a wheelchair wheel; (3) provides a relatively easily retrofitted automatic brake to a conventional wheelchair; (4) retrofits a conventional wheelchair with an automatic brake that is applied to the wheels of the wheelchair when a user is in the process of rising from the wheelchair without using a seat-operated brake; (5) provides an automatic brake for a wheelchair that is operated by the person seated in the wheelchair; and (6) automatically applies wheelchair brakes when the hands of a person rising from a wheelchair bear down upon a horizontally arm-rest-like structure.

The foregoing desired characteristics are provided by the unique wheelchair brake attachment apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a brake attachment apparatus for a wheelchair which includes wheelchair connector means for connecting to the wheelchair, brake operator arm means which extend horizontally along a portion of the wheelchair, brake operator arm hinge means connected to the wheelchair connector means for connecting the brake operator arm means to the wheelchair connector means, and wheel brake member means connected to the brake operator arm means. The wheel brake member means are used for applying braking pressure on a wheel of the wheelchair.

With the wheelchair brake attachment apparatus, the wheelchair is prevented from moving as a patient rises from a sitting position in the wheelchair to a standing position, or is in a standing position and sits in the wheelchair. This is an important feature of the present invention. Since a common undesirable result of a patient rising up from a wheelchair or sitting down in a wheelchair is that the wheelchair moves under the patient, and the patient may lose one's balance and fall, the present invention prevents that undesirable result by braking movement of the wheelchair wheels as the patient rises from or sits down into the wheelchair.

Preferably, the brake operator arm means include a pair of brake operator arms; the wheelchair connector means include a pair of wheelchair connector sleeves and wheelchair-connector-sleeve set screws received in the wheelchair connector sleeves; the brake operator arm hinge means include a pair of brake operator arm hinge pins connected between the brake operator arms and the wheelchair connector sleeves; and the wheel brake member means include a pair of wheel brake members connected to the respective brake operator arms.

Preferably, a pair of return springs are connected between respective brake operator arms and the respective portions of the wheelchair, for keeping the respective wheel brake members raised off of respective wheels of the wheelchair when braking pressure is not applied to the brake operator arms. Each of the wheel brake members includes a brake-shoe-support arm connected to the brake operator arm, and a brake shoe is connected to the brake-shoe-support arm.

Arm-to-arm interconnector and adjustment means are connected between the respective brake operator arms. The arm-to-arm interconnector and adjustment means include a pair of interconnector arm ends for connecting to the respective brake operator arms. Also, the arm-to-arm interconnector and adjustment means includes front-to-back adjustment means, side-to-side adjustment means, and folding and locking means.

The folding and locking means are located midway between a pair of the side-to-side adjustment means. The front-to-back adjustment means are connected to the respective brake operator arms. The front-to-back adjustment means include a pair of guide cylinders connected to ends of respective brake operator arms, wherein each of the guide cylinders includes an internal guide channel. A pair of guide pistons are connected to free ends of the arm-to-arm interconnector and adjustment means, and a pair of slide bearings are connected to the respective guide pistons for retaining the respective guide pistons in the respective guide channels, and a pair of slide bearing fasteners for securing the respective slide bearings to the respective guide cylinders.

The side-to-side adjustment means include a pair of first telescopic tubes connected to the interconnector arm ends, wherein each of the respective first telescopic tubes includes a respective linear array of lock-reception channels. Second telescopic tube means are received in the respective first telescopic tubes. The second telescopic tube means include a pair of channel locks for locking into selected lock-reception channels.

The second telescopic tube means further include a first-half, second telescopic tube and a second-half, second telescopic tube. The folding and locking means include a tube-to-tube hinge connected between the first-half, second telescopic tube and the second-half, second telescopic tube, overlapping locking ends of the respective first-half, second telescopic tube and the respective second-half, second telescopic tube. A locking sleeve is supported by the first-half, second telescopic tube and the second-half, second telescopic tube, for placing over the overlapping locking ends when the first-half, second telescopic tube and the second-half, second telescopic tube are to be maintained in a horizontally locked orientation.

The above brief description sets forth rather broadly the more important features of the present invention in order that the detailed description thereof that follows may be better understood, and in order that the present contributions to the art may be better appreciated. There are, of course, additional features-of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheelchair brake attachment apparatus which has all of the advantages of the prior art and none of the disadvantages.

It is another object of the present invention to provide a new and improved wheelchair brake attachment apparatus which may be easily and efficiently manufactured and marketed.

It is a further object of the present invention to provide a new and improved wheelchair brake attachment apparatus which is of durable and reliable construction.

An even further object of the present invention is to provide a new and improved wheelchair brake attachment apparatus which is susceptible of a low cost of manufacture with regard to both materials and labor, and which accordingly is then susceptible of low prices of sale to the consuming public, thereby making such wheelchair brake attachment apparatus available to the buying public.

Still yet a further object of the present invention is to provide a new and improved wheelchair brake attachment apparatus which avoids the complexities of a three-link arrangement for applying braking pressure on a wheelchair wheel.

Still another object of the present invention is to provide a new and improved wheelchair brake attachment apparatus that employs downwardly vertical pressure on a horizontally oriented brake handle to apply braking pressure to a wheelchair wheel.

Yet another object of the present invention is to provide a new and improved wheelchair brake attachment apparatus which provides a relatively easily retrofitted automatic brake to a conventional wheelchair.

Even another object of the present invention is to provide a new and improved wheelchair brake attachment apparatus that retrofits a conventional wheelchair with an automatic brake that is applied to the wheels of the wheelchair when a user is in the process of rising from the wheelchair without using a seat-operated brake.

Still a further object of the present invention is to provide a new and improved wheelchair brake attachment apparatus which provides an automatic brake for a wheelchair that is operated by the person seated in the wheelchair.

Yet another object of the present invention is to provide a new and improved wheelchair brake attachment apparatus that automatically applies wheelchair brakes when the hands of a person rising from a wheelchair bear down upon a horizontally arm-rest-like structure.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is an enlarged top view of the portion of the embodiment of the invention shown in FIG. 2 taken along line 5—5 thereof, removed from the wheelchair.

FIG. 6 is an enlarged, partially exploded side view of the portion of the embodiment of the invention shown in circled region 6 of FIG. 2.

DESCRIPTION OF THE PREFERRED EMBODIMENT

Figure 1:
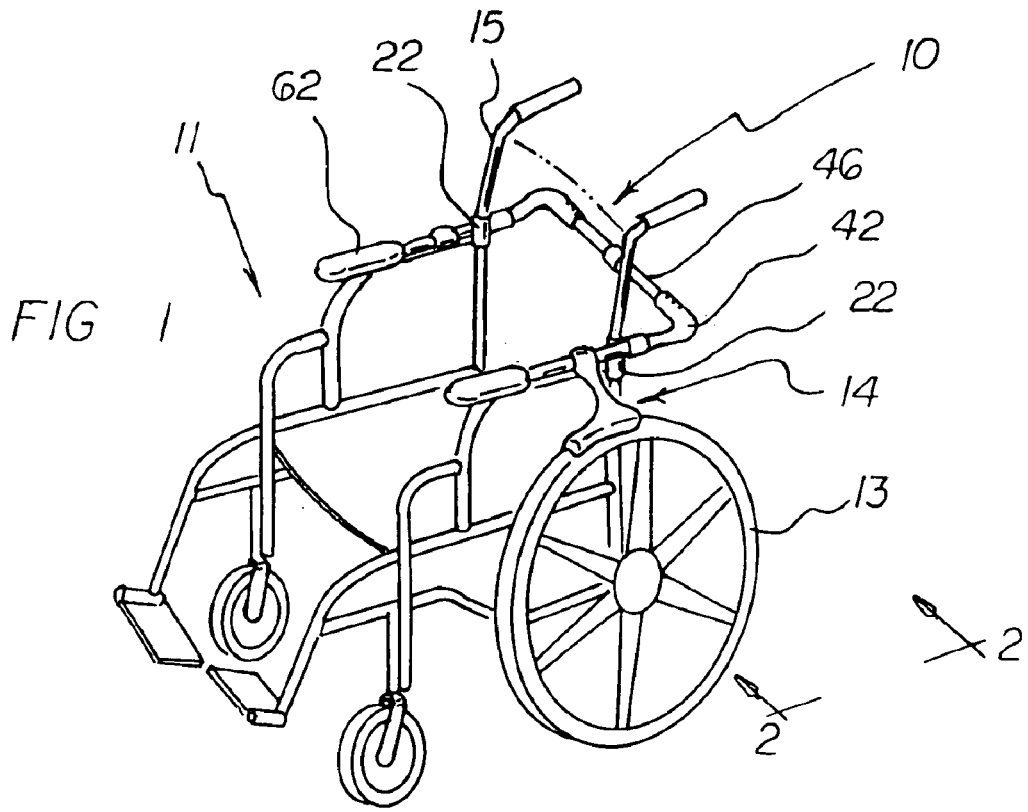
FIG. 1 is a perspective view showing a preferred embodiment of the wheelchair brake attachment apparatus of the invention that is attached to a wheelchair.

With reference to the drawings, a new and improved wheelchair brake attachment apparatus embodying the principles and concepts of the present invention will be described.

Turning to FIGS. 1–6, there is shown an exemplary embodiment of the wheelchair brake attachment apparatus of the invention generally designated by reference numeral 10. In its preferred form, a wheelchair brake attachment apparatus 10 is provided for a wheelchair 11 and includes wheelchair connector means for connecting to the wheelchair 11, brake operator arm means which extend horizontally along a portion of the wheelchair 11, brake operator arm hinge means connected to the wheelchair connector means for connecting the brake operator arm means to the wheelchair connector means, and wheel brake member means connected to the brake operator arm means. The wheel brake member means are used for applying braking pressure on a wheel 13 of the wheelchair 11.

Preferably, the brake operator arm means include a pair of brake operator arms 12; the wheelchair connector means include a pair of wheelchair connector sleeves 22 and wheelchair-connector-sleeve set screws 24 received in the wheelchair connector sleeves 22; the brake operator arm hinge means include a pair of brake operator arm hinge pins 20 connected between the brake operator arms 12 and the wheelchair connector sleeves 22; and the wheel brake member means include a pair of wheel brake members 14 connected to the respective brake operator arms 12.

Preferably, a pair of return springs 18 are connected between respective brake operator arms 12 and the respective portions of the wheelchair 11, for keeping the respective wheel brake members 14 raised off of respective wheels 13 of the wheelchair 11 when braking pressure is not applied to the brake operator arms 12. Each of the wheel brake members 14 includes a brake-shoe-support arm 26 connected to the brake operator arm 12, and a brake shoe 28 is connected to the brake-shoe-support arm 26.

Arm-to-arm interconnector and adjustment means are connected between the respective brake operator arms 12. The arm-to-arm interconnector and adjustment means include a pair of interconnector arm ends 40 (see FIG. 6) for connecting to the respective brake operator arms 12. Also, the arm-to-arm interconnector and adjustment means includes front-to-back adjustment means, side-to-side adjustment means, and folding and locking means.

The folding and locking means are located midway between a pair of the side-to-side adjustment means. The front-to-back adjustment means are connected to the respective brake operator arms 12. The front-to-back adjustment means include a pair of guide cylinders 30 connected to ends of respective brake operator arms 12, wherein each of the guide cylinders 30 includes an internal guide channel 32. A pair of guide pistons 34 are connected to free ends of the arm-to-arm interconnector and adjustment means, and a pair of slide bearings 36 are connected to the respective guide pistons 34 for retaining the respective guide pistons 34 in the respective guide channels 32, and a pair of slide bearing fasteners 38 for securing the respective slide bearings 36 to the respective guide cylinders 30.

The side-to-side adjustment means include a pair of first telescopic tubes 42 connected to the interconnector arm ends 40, wherein each of the respective first telescopic tubes 42 includes a respective linear array of lock-reception channels 44. Second telescopic tube means are received in the respective first telescopic tubes 42. The second telescopic tube means include a pair of channel locks 48 for locking into selected lock-reception channels 44.

The second telescopic tube means further include a first-half, second telescopic tube 46 and a second-half, second telescopic tube 50. The folding and locking means include a tube-to-tube hinge 52 connected between the first-half, second telescopic tube 46 and the second-half, second telescopic tube 50, overlapping locking ends 60 of the respective first-half, second telescopic tube 46 and the respective second-half, second telescopic tube 50. A locking sleeve 54 is supported by the first-half, second telescopic tube 46 and the second-half, second telescopic tube 50, for placing over the overlapping locking ends 60 when the first-half, second telescopic tube 46 and the second-half, second telescopic tube 50 are to be maintained in a horizontally locked orientation.

Figure 2:
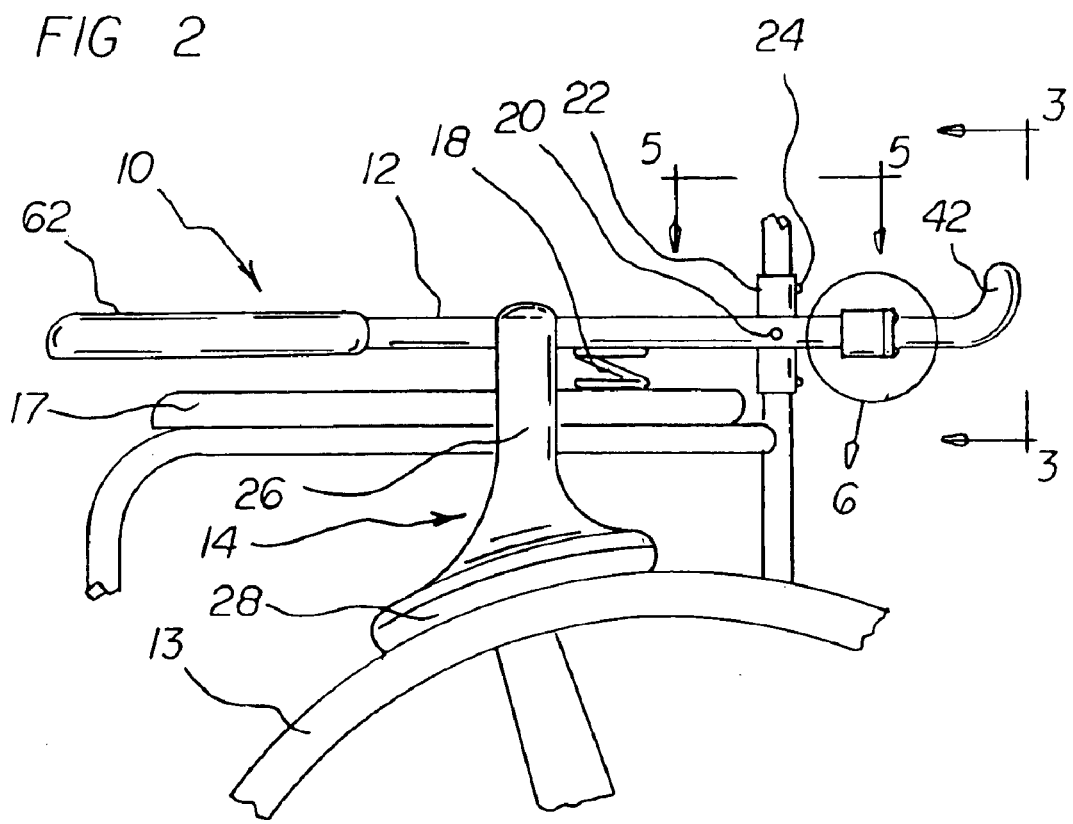
FIG. 2 is an enlarged side view of the portion of the embodiment of the wheelchair brake attachment apparatus shown in FIG. 1 taken along line 2—2 of FIG. 1.

To use the wheelchair brake attachment apparatus 10 of the invention, preferably the vertically oriented handle supports 15 of a wheelchair 11 are selected, and the respective wheelchair connector sleeves 22 are attached to the handle supports 15. The wheelchair-connector-sleeve set screws 24 are used to secure the wheelchair connector sleeves 22 to the handle supports 15. Preferably, the wheelchair connector sleeves 22 are secured to the handle supports 15 so that the brake operator arms 12 are oriented substantially horizontally. Moreover, the brake operator arms 12 are positioned above the conventional wheelchair arm rests 17 and are oriented substantially parallel to the wheelchair arm rests 17. The brake operator arms 12 can also have padded handle portions 62 located at the ends of the brake operator arms 12. The respective return springs 18 are located between the bottoms of the brake operator arms 12 and the top surfaces of the wheelchair arm rests 17. When the return springs 18 are in a relaxed condition, as shown in FIG. 2, the brake operator arms 12 are substantially horizontal, and there is very little weight exerted on the respective wheel brake members 14. Therefore, there is little braking pressure applied by the wheel brake members 14 on the respective wheelchair wheels 13.

However, when a patient (not shown) in the wheelchair 11 makes an effort to rise from sitting in the wheelchair 11, the patient presses down on the brake operator arms 12, just as the patient would press down on the wheelchair arm rests 17 if the brake operator arms 12 of the invention were not installed on the wheelchair 11, the downward pressure of the patient on the brake operator arms 12 is transmitted through the respective brake-shoe-support arms 26 and through the respective brake shoes 28 to the respective wheelchair wheels 13. As a result, the wheelchair 11 is prevented from moving as the patient is rising from a sitting position in the wheelchair 11. This is an important feature of the present invention. Since a common undesirable result of a patient rising up from a wheelchair is that the wheelchair moves under the patient, and the patient may lose one's balance and fall, the present invention prevents that undesirable result by braking movement of the wheelchair wheels 13 as the patient rises from the wheelchair 11.

When the patient no longer exerts one's weight downward on the brake operator arms 12, the return springs 18 lift the wheel brake members 14 off of the wheelchair wheels 13. That is, when the patient is seated in the wheelchair 11, with the patient's arms merely resting on the brake operator arms 12, the respective return springs 18 are strong enough to keep the wheel brake members 14 from exerting an effective braking action of the wheelchair wheels 13.

Stated somewhat differently, when the patient begins to rise up from the sitting position, and when the patient applies a considerable portion of the one's weight force downward on the brake operator arms 12, then the respective upward urgings of the respective return springs 18 are overcome by the patient's weight, and the wheel brake members 14 exert braking actions on the wheelchair wheels 13.

When the brake operator arms 12 are pressed downward, and when the return springs 18 move the brake operator arms 12 upward, the brake operator arms 12 rotate around the respective brake operator arm hinge pins 20.

The wheelchair brake attachment apparatus 10 of the invention has a significant amount of adjustability with respect the size of the wheelchair 11 that it is can readily be installed upon. More specifically, with respect to the positioning of the vertically oriented handle supports 15 and the wheelchair arm rests 17, the wheelchair connector sleeves 22 can be positioned at selected positions on the vertically oriented handle supports 15 so that the brake operator arms 12 are oriented horizontally and substantially parallel to the wheelchair arm rests 17.

For different wheelchairs, the back of a particular wheelchair 11 may extend backward to different degrees. In this respect, there are front-to-back adjustment means to allow the first telescopic tubes 42, the first-half second telescopic tube 46, and the second-half second telescopic tube 50 to be in a front-to-back adjustment range 56, shown in FIG. 4, with respect to the wheelchair connector sleeves 22. More specifically, as shown in FIG. 6, the guide pistons 34 can be slid inside the guide cylinders 30 along the guide channels 32 therein. Once the slide bearings 36 are fastened to the guide cylinders 30 with the slide bearing fasteners 38, the interconnector arm ends 40 can be moved closer to or farther away from the brake operator arm hinge pins 20, along the lengths of the guide channels 32.

Figure 4:
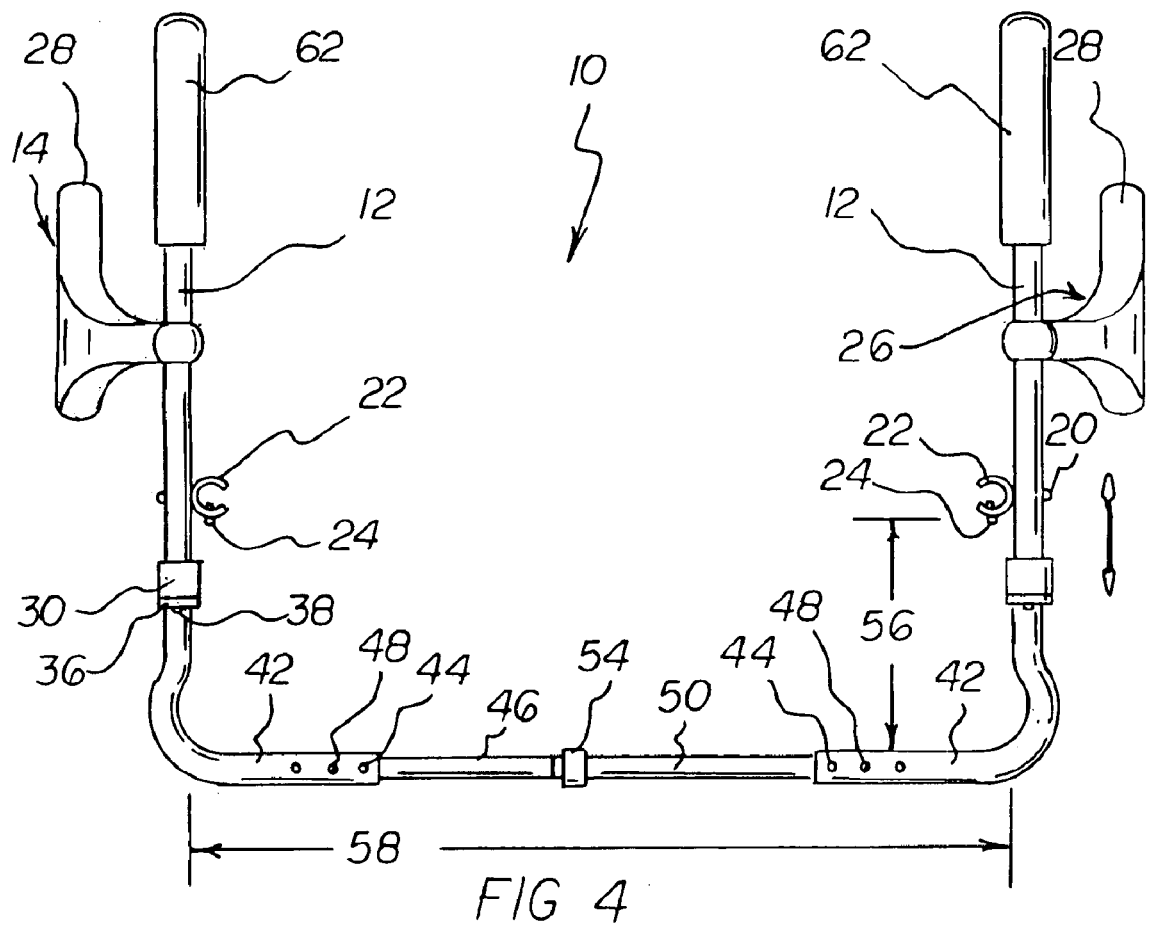
FIG. 4 is a top view of the embodiment of the invention shown in FIG. 3 taken along line 4—4 thereof.

For different wheelchairs, the widths of the wheelchairs can vary. In this respect, side-to-side adjustment means are provided with the invention. More specifically, for wider wheelchairs 11, the channel locks 48 are released, and the first-half, second telescopic tube 46 and the second-half, second telescopic tube 50 are moved to wider adjustment positions along the lock-reception channels 44 in the first telescopic tubes 42. Then, the channel locks 48 are locked into the selected lock-reception channels 44. As shown in FIG. 4, the first telescopic tubes 42, the first-half, second telescopic tube 46, and the second-half, second telescopic tube 50 provide a side-to-side adjustment range 58.

Figure 3:
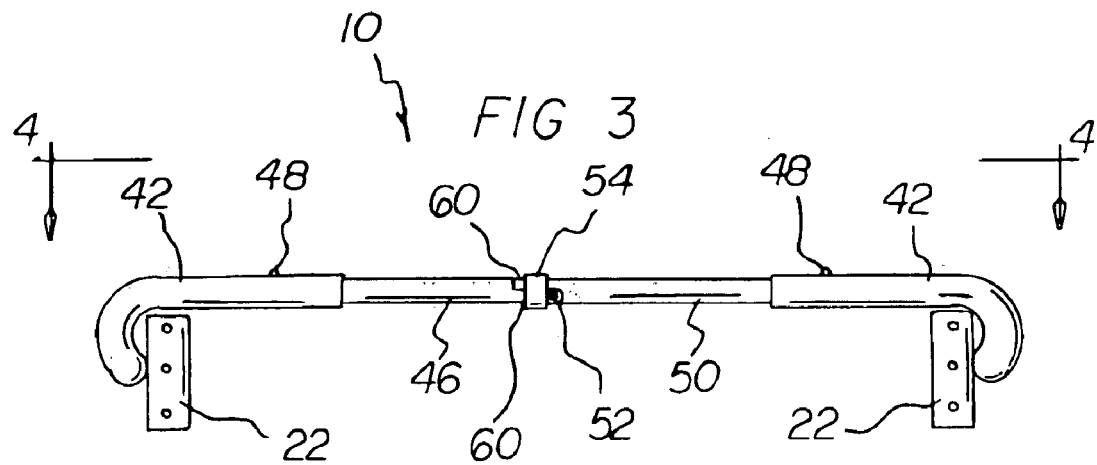
FIG. 3 is a rear view of the embodiment of the wheelchair brake attachment apparatus of FIG. 2 taken along line 3—3 thereof, removed from the wheelchair.

Many wheelchair wheels 13 can be folded for storage. In this respect, the wheelchair brake attachment apparatus 10 of the invention provides a folding feature that permits the wheelchair brake attachment apparatus 10 of the invention to remain attached to the wheelchair 11, even when the wheelchair 11 is folded. More specifically, when the wheelchair 11 and the wheelchair brake attachment apparatus 10 of the invention are not folded, as shown in FIGS. 3 and 4, the locking sleeve 54 is positioned over the overlapping locking ends 60 of the first-half, second telescopic tube 46 and the second-half, second telescopic tube 50. As a result, the first-half, second telescopic tube 46 and the second-half, second telescopic tube 50 are prevented from rotating around the tube-to-tube hinge 52, and the first-half, second telescopic tube 46 and the second-half, second telescopic tube 50 remain locked in a horizontal orientation.

On the other hand, when the wheelchair 11 is to be folded, the locking sleeve 54 is slid away from the overlapping locking ends 60 of the first-half, second telescopic tube 46 and the second-half, second telescopic tube 50. When this is done, the first-half, second telescopic tube 46 and the second-half, second telescopic tube 50 are free to rotate around the tube-to-tube hinge 52, when the wheelchair 11 is folded.

As stated above, the wheelchair brake attachment apparatus 10 of the invention is especially useful for preventing falls, especially by the elderly who regularly forget to lock their wheelchairs when they stand up from a sitting position. Such falls often result in fractures. Often such an unlocked wheelchair spins around causing instability to the patient and resulting in a fall. Such a spinning around of the wheelchair can occur especially when one wheelchair brake is defective and the other wheelchair brake is operating satisfactorily. Also, accidents occur even when both wheelchair brakes are working because the patient often unlocks brakes which are already locked.

Such accidents are avoided by use of the wheelchair brake attachment apparatus 10 of the invention. Simply by applying a downward pressure of one or more of the brake operator arms 12. A braking pressure is transmitted to both of the brake operator arms 12 and to both of the wheel brake members 14 to provide braking pressure on both of the wheelchair wheels 13. More specifically, braking pressure applied to one brake operator arm 12 is transmitted to the other brake operator arm 12 through the first telescopic tubes 42, the first-half, second telescopic tube 46, and the second-half, second telescopic tube 50.

Use of the wheelchair brake attachment apparatus 10 of the invention also prevents accidents when a standing patient is attempted to be seated in a wheelchair. Simply by pressing down on one brake operator arm 12, both wheel brake members 14 are applied to both wheelchair wheels 13, and the wheelchair 11 is prevented from rolling.

The wheelchair brake attachment apparatus 10 of the invention can be used or a wide variety of wheelchairs includes sling-seat, hemi-height, desk arm, full arm, and amputee wheelchairs. Also, the wheelchair brake attachment apparatus 10 of the invention can be made for wheelchairs that have removable arm rests. There can be an adjustment made to anchor the side-frame hinges to the lower seat frame if needed, as well as the side post of the wheelchair.

With any embodiment of the invention, refinements can be provided to optimize operating efficiency and to increase operational life of the apparatus. For example, metal components are selected to avoid metal fatigue. Washers can be placed at moving parts. Harder metals can be used at locations involving greater stress.

The components of the wheelchair brake attachment apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wheelchair brake attachment apparatus that is low in cost, relatively simple in design and operation, and which may advantageously be used to avoid the complexities of a three-link arrangement for applying braking pressure on a wheelchair wheel. With the invention, a wheelchair brake attachment apparatus is provided which employs downwardly vertical pressure on a horizontally oriented brake handle to apply braking pressure to a wheelchair wheel. With the invention, a wheelchair brake attachment apparatus provides a relatively easily retrofitted automatic brake to a conventional wheelchair. With the invention, a wheelchair brake attachment apparatus is provided which retrofits a conventional wheelchair with an automatic brake that is applied to the wheels of the wheelchair when a user is in the process of rising from the wheelchair without using a seat-operated brake. With the invention, a wheelchair brake attachment apparatus provides an automatic brake for a wheelchair that is operated by the person seated in the wheelchair. With the invention, a wheelchair brake attachment apparatus is provided which automatically applies wheelchair brakes when the hands of a person rising from a wheelchair bear down upon a horizontally arm-rest-like structure.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed is:

1. A brake attachment apparatus for a wheelchair having a frame for supporting a seat, a pair of arm rests supported by said frame, and a pair of upwardly extending rails for supporting a backrest, said attachment apparatus comprising:

wheelchair connector means for connecting to the wheelchair upwardly extending rails, brake operator arm means which extend horizontally along a portion of the wheelchair substantially parallel and above said arm rests, brake operator arm hinge means connected to said wheelchair connector means for connecting said brake operator arm means to said wheelchair connector means, and wheel brake member means connected to said brake operator arm means, wherein said wheel brake member means are used for applying braking pressure on a wheel of the wheelchair, wherein said attachment apparatus further comprises a pair of resilient engagement members, connected between said respective brake operator arm means and said wheelchair arm rests for keeping said respective wheel brake members off of respective wheels of the wheelchair when downward braking pressure is not applied to said brake operator arm means.

2. The apparatus of claim 1 wherein:

said brake operator arm means include a pair of brake operator arms, said wheelchair connector means include a pair of wheelchair connector sleeves and wheelchair-connector-sleeve set screws received in said wheelchair connector sleeves for connecting said connector sleeves to said pair of upwardly extending rails, respectively, said brake operator arm hinge means include a pair of brake operator arm hinge pins connected between said brake operator arms and said wheelchair connector sleeves, and said wheel brake member means include a pair of wheel brake members connected to said respective brake operator arms.

3. The apparatus of claim 2 wherein said pair of resilient engagement members includes a pair of return springs.

4. The apparatus of claim 2 wherein each of said wheel brake members includes:

a brake-shoe-support arm connected to said brake operator arm, and a brake shoe connected to said brake-shoe-support arm.

5. The apparatus of claim 2, further including:

arm-to-arm interconnector and adjustment means connected between said respective brake operator arms.

6. The apparatus of claim 5 wherein said arm-to-arm interconnector and adjustment means include a pair of interconnector arm ends for connecting to said respective brake operator arms.

7. The apparatus of claim 5 wherein said arm-to-arm interconnector and adjustment means include:

front-to-back adjustment means, side-to-side adjustment means, and folding and locking means.

8. The apparatus of claim 7 wherein said folding and locking means is located midway between a pair of said side-to-side adjustment means.

9. The apparatus of claim 7 wherein said front-to-back adjustment means are connected to said respective brake operator arms.

10. The apparatus of claim 7 wherein said front-to-back adjustment means include:
- a pair of guide cylinders connected to ends of respective brake operator arms, wherein each of said guide cylinders includes an internal guide channel,
- a pair of guide pistons connected to free ends of said arm-to-arm interconnector and adjustment means, and
- a pair of slide bearings connected to said respective guide pistons for retaining said respective guide pistons in said respective guide channels, and
- a pair of slide bearing fasteners for securing said respective slide bearings to said respective guide cylinders.

11. The apparatus of claim 7
wherein said arm-to-arm interconnector and adjustment means include a pair of interconnector arm ends for connecting to said respective brake operator arms, and
wherein said side-to-side adjustment means include:
- a pair of first telescopic tubes connected to said interconnector arm ends, wherein each of said respective first telescopic tubes includes a respective linear array of lock-reception channels, and
- second telescopic tube means received in said respective first telescopic tubes, wherein said second telescopic tube means include a pair of channel locks for locking into selected lock-reception channels.

12. The apparatus of claim 11 wherein said second telescopic tube means further include:
- a first-half, second telescopic tube, and
- a second-half, second telescopic tube.

13. The apparatus of claim 12 wherein said folding and locking means include:
- a tube-to-tube hinge connected between said first-half, second telescopic tube and said second-half, second telescopic tube,
- overlapping locking ends of said respective first-half, second telescopic tube and said respective second-half, second telescopic tube, and
- a locking sleeve, supported by said first-half, second telescopic tube and said second-half, second telescopic tube, for placing over said overlapping locking ends when said first-half, second telescopic tube and said second-half, second telescopic tube are to be maintained in a horizontally locked orientation.

* * * * *